July 9, 1929.                B. KNUPFER                1,720,130
                          OBLIQUE SEAT VALVE
                          Filed Aug. 28, 1928

Inventor:
Bernhard Knupfer
By Emil Bönnelycke
                Attorney

Patented July 9, 1929.

1,720,130

UNITED STATES PATENT OFFICE.

BERNHARD KNUPFER, OF BOCHUM, GERMANY.

OBLIQUE-SEAT VALVE.

Application filed August 28, 1928, Serial No. 302,592, and in Germany June 29, 1926.

In the known oblique-seat valves, as for instance now employed for the regulation of the flow of liquids, vapours and gases through a straight pipe-line, the inclined position of the valve-seat to the pipe-line makes it necessary to give at least one of the valve sockets the shape of a bend, if it is desired to obtain a circular valve seat aperture. Valves of this kind have for the reasons mentioned above not only a complicated construction but above all do not permit a straight passage of the medium through the valve.

Even when the curvature of the valve socket is left out of consideration and a valve chamber simply cut at an oblique angle and provided with an elliptical passage-mouth is used, a valve seat aperture of an excessively large diameter will be obtained, if otherwise it is not intended to employ an elliptical valve-disk too. The diameter of such a circular valve-disk would have to be at least equal to the major axis of the ellipse of said elliptical passage-mouth, which fact would in turn necessitate a proportionate increase of the valve chamber.

These disadvantages are avoided by the oblique-seat valve constructed in accordance with my present invention in which the flanged valve socket arranged adjacent to the valve-seat changes its shape in such a manner that the circular cross-section at its flanged end gradually goes over into an elliptical cross-section cut by the face of the valve-seat to produce a circular valve-seat with a circular aperture. In this manner it is made possible to obtain on the valve-seat and on the valve-disk tightening circular faces of the smallest diameter possible. Compared in this respect with known valves furnished with a valve chamber cut at an oblique angle and provided with an elliptical passage-mouth, the specific pressure of the valve-disk is greater and therefore more advantageous in my improved valve than in any one of the known valves of this kind, whereas the pressure of the medium already raised is smaller on the valve-disk and therefore likewise more advantageous in my improved valve on account of the smaller diameter of the valve-disk.

In many cases a valve would be of advantage wherein the elliptical structural feature of the valve chamber adjacent to the valve-seat is executed with a view to let the elliptical cross-section of the passage for the medium equal the circular cross-section of the valve socket at its flanged end. The equality of these cross-sections is, however, not an essential requirement of the invention, since the advantages mentioned above will be obtained to a corresponding degree even then, when the elliptical cross-section in question is chosen to be smaller than the circular cross-section of the pipe-line wherein the valve is arranged.

In the accompanying drawing my invention is illustrated by way of example by a valve wherein the elliptical configuration of the valve chamber adjacent to the inclined valve-seat is executed in such a manner that the cross-section of the elliptical passage for the medium equals the circular cross-section at the flanged end of the valve socket.

Figure 1:
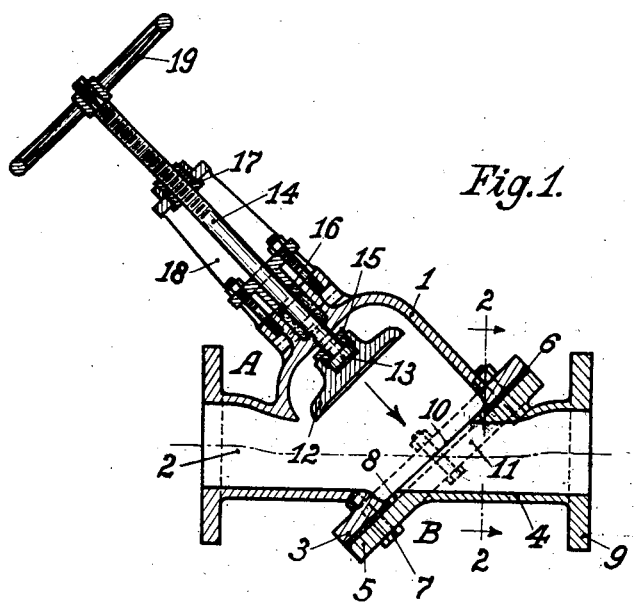
Figure 1 represents a vertical longitudinal section of my improved valve.
Figure 2:
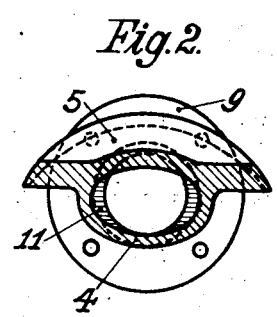
Figure 2 is a cross sectional view taken on line 2—2 of Figure 1.
Figure 3:
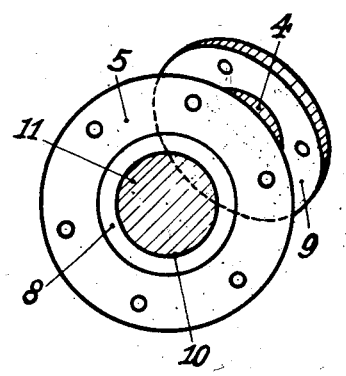
Figure 3 is a plan view of the lower part of the valve chamber seen in the direction of the arrow indicated in Figure 1.

My improved oblique-seat valve is composed of the two sections A and B of which the former mainly consists of a valve chamber 1 provided with a flanged socket 2 and an inclined division-flange 3. The other section of the valve consists of a flanged valve socket 4 likewise provided with an inclined division-flange 5. Between the flanges 3 and 5 a packing 6 is arranged and adapted to form a tight joint at this point when said flanges are drawn together by bolts 7. The valve-seat 8 is arranged on the upper face of the flange 5 and in order to obtain a circular aperture in the face of said valve-seat the walls of the valve socket 4 gradually merge from its flange 9 toward the valve-seat 8 into a pipe-like member of an elliptical cross-section which peculiarity in connection with the angle at which the face of the valve-seat intersects the common center-line of the sockets 2 and 4 assures the true circular aperture 10 in the face of the valve-seat 8. This aperture forms the mouth of the elliptical passage 11 for the medium arranged just in front of the valve-seat 8. It will be observed that in order to obtain this elliptical deformation of the valve socket 4 only the upper and the lateral parts of the socket-walls have been altered, as shown in Figures 1 and 2, whereas the lower portion of the socket-walls is kept straight. This arrangement is made with a view to obtain on the one hand a substantially straight passage for the medium through the valve and thus assure a complete emptying of the pipe-line, and on the other hand avoid any dead spaces within the valve chamber 1, to which end also the upper portion of the wall of the valve socket 2 is shaped in a similar manner, as indicated in Figure 1.

The circular valve-disk 12 is rotatably attached to the head 13 of a valve-spindle 14 by means of a flanged ring 15 screwed into the hub of said valve-disk. The valve-spindle 14 passes in the usual manner from the valve chamber 1 outward through a stuffing box 16 and the threaded part of said valve-spindle is seated in a nut 17 secured in a bridge 18 of any suitable construction applied to the valve chamber 1. The longitudinal or rectilinear motion of the valve-spindle 14 in the nut 17 is initiated by means of a handwheel 19 seated on the upper end of the valve-spindle 14.

I claim:—

1. An oblique-seat valve, comprising a valve chamber, an inclined valve-seat arranged in said valve chamber, and two flanged valve sockets arranged on said chamber of which sockets one has its walls shaped to cause the circular cross-section at the flanged socket-end to merge toward said valve-seat into an elliptical cross-section intersected by the face of said valve-seat at an angle adapted to produce a circular aperture in the face of said valve-seat.

2. An oblique-seat valve, comprising a valve chamber, an inclined valve-seat arranged in said valve chamber, and two flanged valve sockets provided on said chamber of which sockets one has its walls shaped to cause the circular cross-section at the flanged socket-end to merge toward said valve-seat into an elliptical cross-section adapted to form adjacent to said valve-seat an elliptical passage equal in area with the circular cross-section at the flanged socket-end and intersected by the face of said valve-seat at an angle adapted to produce a circular aperture in the face of said valve-seat.

3. An oblique-seat valve, comprising a valve chamber, an inclined valve-seat arranged in said valve chamber and provided with a circular passage-mouth, and two flanged valve sockets arranged on said chamber in register with each other of which sockets one has its walls shaped to cause the circular cross-section at the flanged socket-end to merge toward said valve-seat into an elliptical cross-section to permit the main flow of fluid to pass through said valve on a substantially straight line, a circular valve-disk adapted to hermetically close the valve-seat, and means for moving said valve-disk in a rectilinear direction back and forth.

4. An oblique-seat valve, comprising a valve chamber, an inclined valve-seat arranged in said valve chamber and provided with a circular passage-mouth, two flanged valve sockets arranged on said chamber in register with each other of which sockets one has its walls shaped to cause the circular cross-section at the flanged socket-end to merge toward said valve-seat into an elliptical cross-section in a manner to leave the bottom portion of the altered walls of said valve socket straight to assure the complete emptying of the pipe-line, a circular valve-disk adapted to hermetically close said valve-seat, a valve-spindle rotatably connected with said valve-disk, and external means for operating said valve-spindle.

In testimony whereof I affix my signature.

BERNHARD KNUPFER.